US005826074A

United States Patent [19]
Blomgren

[11] Patent Number: 5,826,074
[45] Date of Patent: Oct. 20, 1998

[54] EXTENSTION OF 32-BIT ARCHITECTURE FOR 64-BIT ADDRESSING WITH SHARED SUPER-PAGE REGISTER

[75] Inventor: James S. Blomgren, San Jose, Calif.

[73] Assignee: S3 Incorporated, Santa Clara, Calif.

[21] Appl. No.: 755,547

[22] Filed: Nov. 22, 1996

[51] Int. Cl.⁶ ................................ G06F 9/32; G06F 9/42
[52] U.S. Cl. .................... 395/581; 395/387; 395/580; 395/581; 395/584; 395/585; 395/586; 395/800.23; 395/800.41; 395/800.42; 711/2; 711/6; 711/202; 711/203; 711/204; 711/206; 711/212
[58] Field of Search ................................ 395/387, 571, 395/580, 581, 584, 585, 586, 800.23, 800.41, 800.42; 711/2, 6, 202, 203, 204, 206, 212

[56] References Cited

U.S. PATENT DOCUMENTS

| | | | |
|---|---|---|---|
| 4,449,184 | 5/1984 | Pohlman, III et al. | 364/200 |
| 5,097,436 | 3/1992 | Zurawski | 364/787 |
| 5,163,140 | 11/1992 | Stiles et al. | 711/140 |
| 5,276,635 | 1/1994 | Naini et al. | 364/787 |
| 5,319,606 | 6/1994 | Bowen et al. | 365/230.06 |
| 5,327,369 | 7/1994 | Ashkenazi | 364/787 |
| 5,331,645 | 7/1994 | Miller et al. | 371/37.1 |
| 5,335,333 | 8/1994 | Hinton et al. | 395/400 |
| 5,420,992 | 5/1995 | Killian et al. | 395/375 |
| 5,426,751 | 6/1995 | Sawamoto | 395/400 |
| 5,430,864 | 7/1995 | Powell et al. | 395/500 |
| 5,450,607 | 9/1995 | Kowalczyk et al. | 395/800 |
| 5,479,639 | 12/1995 | Ewertz et al. | 395/430 |
| 5,481,689 | 1/1996 | Stamm et al. | 395/412 |
| 5,592,634 | 1/1997 | Circello et al. | 395/586 |
| 5,608,886 | 3/1997 | Blomgren et al. | 395/586 |

*Primary Examiner*—Larry D. Donaghue
*Assistant Examiner*—John Follansbee
*Attorney, Agent, or Firm*—Fenwick & West LLP

[57] ABSTRACT

A processor has 64-bit operand execution pipelines, but a 32-bit branch pipeline. The branch pipeline contains registers to hold the lower 32-bit sub-addresses of 64-bit target and sequential addresses for conditional branches which have been predicted but not yet resolved. A shared register contains the upper 32 address bits for the target and sequential sub-addresses. All 32-bit target and sequential sub-address registers in the branch pipeline share the single 32-bit shared register holding the upper 32 address bits. The branch pipeline can only process instructions with the same upper 32 address bits, which define a 4 Giga-Byte super-page. When an instruction references an address in a different 4 Giga-Byte super-page, then the branch pipeline stalls until all other branch instructions have completed. The new super-page's upper 32 address bits are then loaded into the shared register. A super-page crossing is detected by a carry out of bit 32 in the 32-bit target or sequential address adders. Branches crossing to a new super-page are always predicted as taken. The super-page address is incremented during mis-prediction recovery when the sequential instruction stream crosses to a new super-page.

20 Claims, 4 Drawing Sheets

EXTENSTION OF 32-BIT ARCHITECTURE FOR 64-BIT ADDRESSING WITH SHARED SUPER-PAGE REGISTER

BACKGROUND OF THE INVENTION

1. Field of the Invention

This invention relates to computer architectures, and more particularly to extending architectures for wider operands and addresses.

2. Description of the Related Art

Computer processors, microprocessors, and central processing units (CPU's) are often described by the number of bits in data operands operated upon. A 32-bit processor such as the 486 microprocessor manufactured by Intel Corp. of Santa Clara, Calif. and Advanced Micro Devices of Sunnyvale, Calif. operate on 32-bit operands. The datapaths, adders, registers, and address translators in the 486 accept integer operands up to 32-bits in width. The earlier 286 microprocessor operated upon 16-bit operands. The Pentuim™ microprocessor also operates on 32-bit operands, although a 64-bit data bus is used to transfer operands from an external memory to an on-chip cache.

The number of unique locations that can be accessed, the maximum storage or address space, is determined by the number of address bits. The 8088 microprocessor had a 20-bit address which could address $2^{20}$ address locations, an address space of about one million bytes. The 386 and 486 processors generated 32-bit addresses, yielding a 4 giga-byte (GByte) address space. For quite some time now a 32-bit address has been sufficient and will continue to be sufficient for many applications.

Today's high-density integrated circuits (IC's) allow entire systems to be put on a single chip. Computer programs to aid in the design, simulation, and verification of these complex circuits require large databases to describe these systems-on-a-chip. These computer-aided-design (CAD) databases can exceed the 4-GByte limit of a 32-bit address space. Thus an address space larger than 4 Gbytes is desirable.

The PowerPC™ architecture is also a 32-bit architecture operating on 32-bit operands, however, a 64-bit PowerPC™ extension has been implemented in the PowerPC™ 620 microprocessor. The 64-bit architecture greatly expands the address space, allowing CAD programs to directly access the huge databases needed to design future electronics systems.

The 64-bit PowerPC™ architecture uses a 32-bit format for instructions, so existing instruction decoders could be used. The address size is increased from 32-bits to 64-bits. Address pointers are 64 bits in size. Instructions and data operands can be located anywhere in a 64-bit address space. Data operands, which can be used as address components, have a maximum size which is extended from 32-bits up to 64 bits. Table 1 highlights the different address, operand, and instruction sizes (in bits) for the PowerPC™ architecture.

TABLE 1

Extension from 32 to 64 Bit PowerPC ™ Architecture

|  | 32-Bit PowerPC ™ | 64-Bit PowerPC ™ |
| --- | --- | --- |
| Instruction Size | 32 | 32 |
| Operand Size | 32 | 64 |
| Instruction Logical Address Size | 32 | 64 |
| Operand Logical Address Size | 32 | 64 |
| Virtual Address Size | 52 | 80 |
| Real Address Size | 32 | 40 to 64 |

The logical address is the internal address generated by the execution pipelines, sometimes called the program address. The virtual address is the address after translation for a segmented address space, while the real address is the address presented to the external memory. The real address is often called the physical address. Often only a subset of the physical address bits are presented to external memory to reduce the number of pins on the microprocessor chip. For example, only 40 of the 64 bits of the physical address may be presented on the pins of the microprocessor chip for earlier generations of the 64-bit processor, while processors from the next century will use more address bits for future applications.

A processor typically has several pipelines. An integer or execution pipeline performs algebraic operations on operands, such as adding two operands together. A branching pipeline processes branch or jump instructions, generating a target address of the branch instruction, and the next sequential address. When the branch instruction is not a taken branch, then the next sequential instruction is fetched from the next sequential address. However, when the branch is taken, then the next instruction is fetched from the target address.

FIG. 1 is a diagram of a prior-art 32-bit processor with an operand pipeline and branching pipelines. Operands are staged down operand pipeline 14 through several stages such as operand-address generate, operand fetch, or an execute stage which uses an arithmetic-logic-unit (ALU) to operate on one or two operands. Most pipeline stages contain one or more 32-bit registers to temporarily hold one or more 32-bit operands.

A branching unit or facility also requires several pip-estages for processing a branch instruction. The branch unit uses a program or instruction counter to increment the instruction address as sequential instructions are fetched. Branch instructions may be taken, causing the instruction stream to jump to a target instruction located at the target address. Since it is generally not known early in the pipeline if the branch is taken or not, both the next sequential instruction address and the target address are staged down the pipeline. Sequential instruction-address pipeline 10 receives the next sequential instruction's address from the program counter and stages this sequential address down the pipeline until it can be determined if the branch is taken or not. The target address is generated and staged down target address pipeline 12.

Pipeline registers are needed in each stage of pipelines 10, 12, 14 to hold the next sequential instruction's address, the target address, and one or more operands. Extending operands and addresses from 32-bits to 64-bits can double the width of these registers, and the datapaths, adders, and other resources in the pipelines.

What is desired is to extend a 32-bit processor to 64-bits. It is desired to reduce the number of register bits needed in the processor's pipelines when 64-bit instructions and operands are processed. It is desired to support 64-bit addresses using 32-bit branching hardware with extensions for the larger address size.

SUMMARY OF THE INVENTION

A sixty-four-bit processor generates 64-bit addresses of instructions and 64-bit operands. The processor has an operand pipeline for executing algebraic instructions on the 64-bit operands and generating 64-bit results. The operand pipeline generates 64-bit addresses of operands.

A branch pipeline processes conditional branch instructions. The branch pipeline outputs a 64-bit target address when a conditional branch instruction is taken, but the branch pipeline outputs a 64-bit sequential address when the conditional branch instruction is not taken. The branch pipeline includes a target adder means which generates a target sub-address of less than 64 address bits. Pipeline means successively stores the target sub-address and other target sub-addresses from other branch instructions in a plurality of target sub-address registers.

A shared upper-address-bits register stores a plurality of most-significant address bits for the target sub-address and for the other target sub-addresses in the plurality of target sub-address registers. Target output means is coupled to the shared upper-address-bits register and the pipeline means. It combines the plurality of most-significant address bits with the target sub-address to output the 64-bit target address when the conditional branch instruction is taken. Sequential output means outputs the 64-bit sequential address when the conditional branch instruction is not taken. Thus the shared upper-address-bits register stores most-significant address bits for the plurality of target sub-addresses in the target sub-address registers.

In further aspects of the invention the branch pipeline has detect means coupled to the target adder means. It detects when the 64-bit target address has most-significant address bits which do not match the most-significant address bits stored in the shared upper-address-bits register. The detect means outputs an overflow signal. Stall means is coupled to the detect means. It stalls execution of the conditional branch instruction when the overflow signal is output until other conditional branch instructions have completed processing and the other target sub-addresses in the plurality of target sub-address registers have been removed from the plurality of target sub-address registers. Thus the plurality of target sub-address registers can only contain target sub-addresses for 64-bit target addresses has the most-significant address bits matching the shared upper-address-bits register.

In still further aspects a sequential sub-address register stores a sequential sub-address having less than 64 address bits. Sequential increment means is coupled to the sequential sub-address register, and it increments the sequential sub-address when the conditional branch instruction is not taken or when non-branching instructions are processed. The sequential output means is coupled to the shared upper-address-bits register and includes means for combining the plurality of most-significant address bits with the sequential sub-address to output the 64-bit sequential address when the conditional branch instruction is not taken. Thus the shared upper-address-bits register stores the most-significant address bits for the 64-bit sequential address and the 64-bit target address.

In further aspects the most-significant address bits are exclusive of address bits stored in the target sub-address registers. Thus the most-significant address bits do not overlap sub-address bits. The most-significant address bits stored in the shared upper-address-bits register are 32 address bits. The target sub-address registers store a sub-address of 32 address bits.

In still further aspects the target adder means is a 32-bit adder. The overflow signal is a carry out of a most-significant 32nd bit-position in the 32-bit adder. Thus the carry out detects an overflow indicating when the 64-bit target address has most-significant address bits which do not match the most-significant address bits stored in the shared upper-address-bits register.

In further aspects of the invention a super-page-crossing detect means is coupled to a carry-out signal from the sequential increment means. It signals that the 64-bit sequential address has most-significant address bits which do not match the most-significant address bits stored in the shared upper-address-bits register. Thus the carry out signal detects an overflow indicating when the 64-bit sequential address has most-significant address bits which do not match the most-significant address bits stored in the shared upper-address-bits register.

DETAILED DESCRIPTION

The present invention relates to an improvement in computer architecture. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A straightforward way to extend a 32-bit computer architecture to 64 bits is to simply double the width of all registers, adders, and datapaths. The wider datapaths require more silicon area and thus increase cost. Delays increase since loading is doubled as the datapaths' controls double in width. Wiring interconnect increases in length, further increasing delays.

Figure 1:
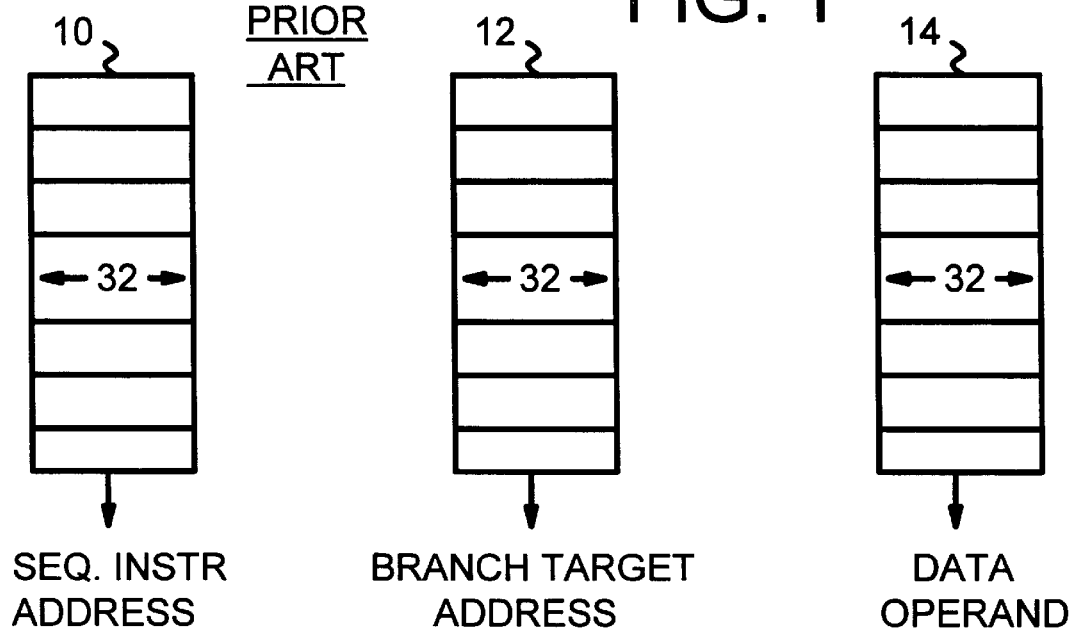
FIG. 1 is a diagram of a prior-art 32-bit processor with an operand pipeline and branching pipelines.
Figure 2:
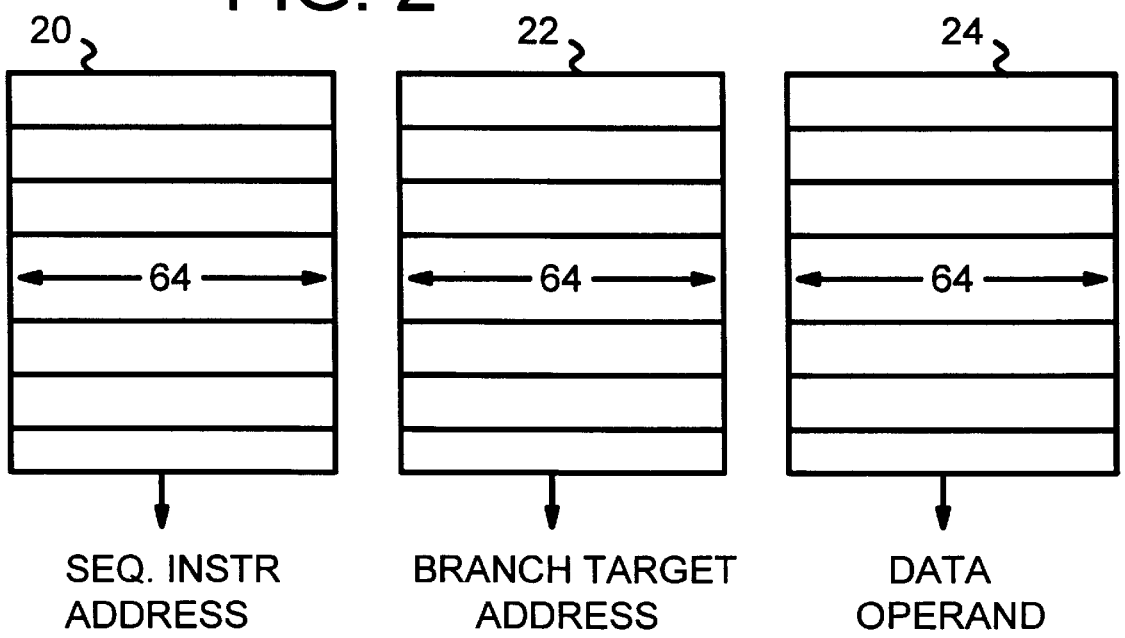
FIG. 2 is a diagram of a 64-bit processor's pipelines created simply by doubling all pipelines to 64-bits.

FIG. 2 is a diagram of a 64-bit processor's pipelines created simply by doubling all pipelines to 64-bits. Data operands of 64-bits each are processed by an execution unit in operand pipeline 24. Most pipestages of operand pipeline 24 store one or two 64-bit operands, and a 64-bit adder and a 64-bit ALU are provided for operating on full 64-bit operands. These 64-bit operands can themselves be used as 64-bit addresses of operands stored in memory.

Instruction addresses can also be 64 bits. Conditional branch instructions are followed by two possible instruction addresses:

1. Taken branches jump to the target instruction's address
2. Not-Taken branches continue with the next sequential instruction's address.

Sequential address pipeline 20 contains 64-bit registers in each stage for holding the 64-bit sequential instruction address. Target address pipeline 22 contains 64-bit registers in each stage to hold the 64-bit target address.

Thus many 64-bit registers are used in the simple extension of the 32-bit architecture to 64 bits. These registers are expensive as they increase the area and delays in the processor core. Datapath logic and interconnect in the pipelines must also be extended to 64 bits.

FULL 64-BIT ADDRESS USED INFREQUENTLY

The inventor has realized that the full 64-bit address size is not needed at all times. When the processor generates a series of addresses with the same upper 32 address bits, the upper 32 address bits remain constant. Only when an address changes to a different upper 32 address bits is full 64-bit address generation needed.

Operation of the 64-bit processor can be simplified when the upper 32 address bits remain constant. All pipeline stages can use a single register holding the upper 32 address bits. Thus only the lower 32 address bits need be stored in the many pipeline registers. The branching pipelines which generate addresses can still generate and store 32-bit addresses, the lower 32 bits of the new 64-bit addresses. The upper 32 bits of the address is read from a single register holding the upper 32 bits for all pipeline stages.

When the upper 32 address bits are changed, the processor halts pipelining and executes instructions one-at-a-time, serializing the instructions. Thus the complexities of pipelining are avoided when the upper address bits change.

Serializing the pipelines reduces performance. Thus when the upper 32 address bits change and the pipeline must be serialized, performance suffers. However, it is anticipated that changes in the upper 32 address bits are infrequent.

It may appear surprising that changes in the upper 32 address bits is anticipated to be infrequent, since there are $2^{32}$ or over 4 billion possible values for these upper 32 address bits. Simple logic suggests that it is very unlikely that a series of random accesses all occur with the same value of the upper 32 address bits. However, addresses are not generated at random. Computer-programs tend to have locality of access. Long or far jumps are much less common than short, near jumps. When older 32-bit software code is executed on the 64-bit processor, the instructions generate addresses as if the addresses were limited to 32 bits. Programmers could continue to write program code which tends to generate addresses which only vary the lower 32 bits. Most jump instructions only allow a jump using 26 address bit, and are therefore limited to a 64 Megabyte region. Thus the inventor believes that changes in the upper 32 address bits will be infrequent.

64-BIT PROCESSOR WITH 32-BIT ADDRESSING PIPELINES—FIG. 3

Figure 3:
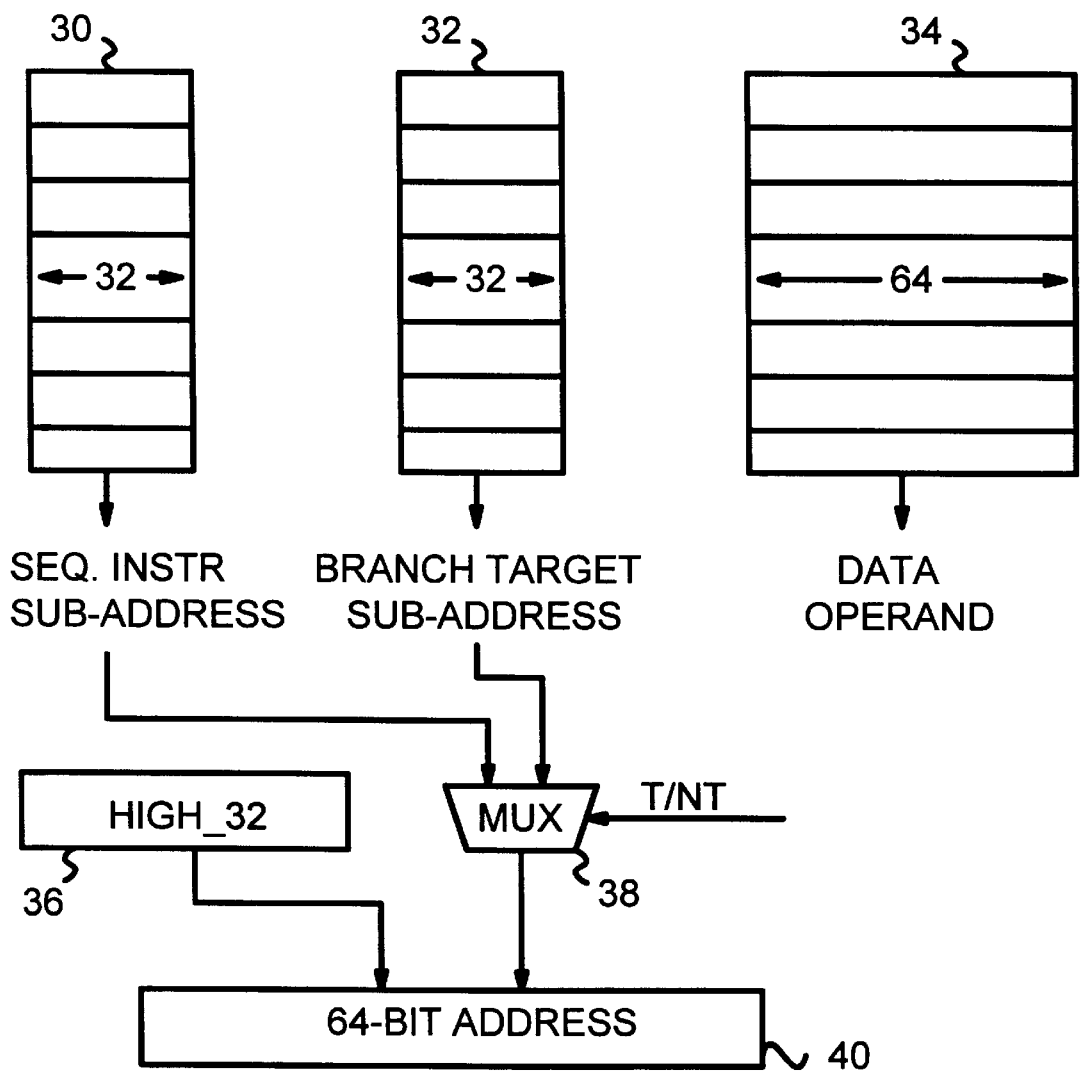
FIG. 3 is a diagram of a 64-bit processor which has a 64-bit operand pipeline but 32-bit addressing pipelines and a single register for the upper 32 bits of a 64-bit address.

FIG. 3 is a diagram of a 64-bit processor which has a 64-bit operand pipeline but 32-bit addressing pipelines and a single register for the upper 32 bits of a 64-bit address. All addresses in the pipelines are restricted to having the same upper 32 address bits. When an address is generated with a different value for the upper 32 address bits, then the pipelines must stall instructions using the address with the new upper 32 bits until all earlier instructions using the old upper 32 address bits have completed the pipelines.

Upper-address register 36 is a single register containing the upper 32 bits of 64-bit address 40. The lower 32 address bits are generated in the branching pipelines. Sequential instruction address pipeline 30 generates the lower 32 bits of the next sequential instruction. The lower 32 bits or sub-address of the 64-bit address is stored in 32-bit registers in each pipestage and is staged down the pipeline.

Branch target address pipeline 32 generates target sub-addresses for branch instructions. The lower 32 bits of the 64-bit target address are generated and staged down pipeline 32. Each stage of pipeline 32 has a 32-bit register for temporarily storing the 32-bit target sub-address. The upper 32 bits of the branch target address are stored in upper-address register 36.

The sequential addresses and the target addresses must all have the same upper 32 bits, since only one register is provided, upper-address register 36. When a sequential or target address is generated with a different upper 32 address bits, then the generated address cannot continue down the pipeline until all earlier instructions are completed, and upper-address register 36 is loaded with the new upper 32 address bits for the generated address.

At the bottom of the pipelines the branch condition is evaluated to determine if a conditional branch is taken or not taken. Taken branches jump to the target address, and the program or instruction address counter is loaded with the target address to fetch the next instruction at the target address. Not-taken branches discard the target address and continue to fetch the next instruction from the next sequential instruction's address.

Branch prediction is often used. Branch prediction requires that a guess is made near the beginning of the pipeline. The guess is whether the branch is taken or not taken. A predicted taken branch causes fetching to immediately jump to the target address. Should the prediction be correct, the target instruction has already been fetched and processing of that target instruction may have also begun. However, if the prediction was wrong, the target instruction must be flushed or invalidated from the pipeline and the next sequential instruction fetched and loaded into the pipelines. A penalty of several clock cycles normally occurs for mis-predictions.

Mispredictions require that the sequential and target addresses be saved and made available when the misprediction is detected. Thus both the sequential address and the target address generated near the top of pipelines 30, 32 are staged down the pipelines. At the bottom of the branching pipelines, mux 38 selects the sequential instruction sub-address from sequential address pipeline 30 when it is finally determined that the branch is not taken. When the branch is taken, mux 38 selects the target sub-address from target address pipeline 32. The selected sub-address from mux 38 becomes the lower 32 address bits of 64-bit address 40, while the upper 32 address bits are supplied by upper-address register 36.

OPERAND ADDRESSES FREQUENTLY USE ALL 64 BITS

While instructions tend to have locality of reference, with instruction addresses tending to have the same upper 32 address bits, operands do not necessarily have locality of reference. Addresses of operands which are generated by the processor could frequently jump to widely different memory locations. Thus the inventor believes that full 64-bit address generation is needed for operands although not for instruction addresses.

Operand pipeline 34 includes address generation logic which generates full 64-bit operand addresses from 64-bit operands or address components. Operands can be fetched from anywhere in the 64-bit address space without penalty. Thus while branching addresses often can be simplified to 32-bit sub-addresses, operand addresses must use full 64-bit addresses.

Upper-address register 36 does not contain the upper 32 address bits for operand addresses; only for instruction addresses. The upper 32 address bits for operand addresses are stored in the 64-bit registers in various stages of operand pipeline 34.

Thus FIG. 3 shows a mixed 64-bit architecture. Operand addresses are generated in a full 64-bit pipeline, while 64-bit instruction addresses are generated from 32-bit pipelines with an external 32-bit upper-address registers.

Operand addresses use a full 64-bit pipeline, allowing operands to be fetched from any location in the address space without penalty. Since instructions have locality of reference, the upper 32 address bits of instruction addresses do not change frequently. Instruction addresses are stored as 32-bit sub-addresses in the branching pipelines. All instruction addresses in the pipelines share a common upper-address register which supplies the upper 32 address bits.

64-BIT ADDRESS SPACE—FIG. 4

Figure 4:
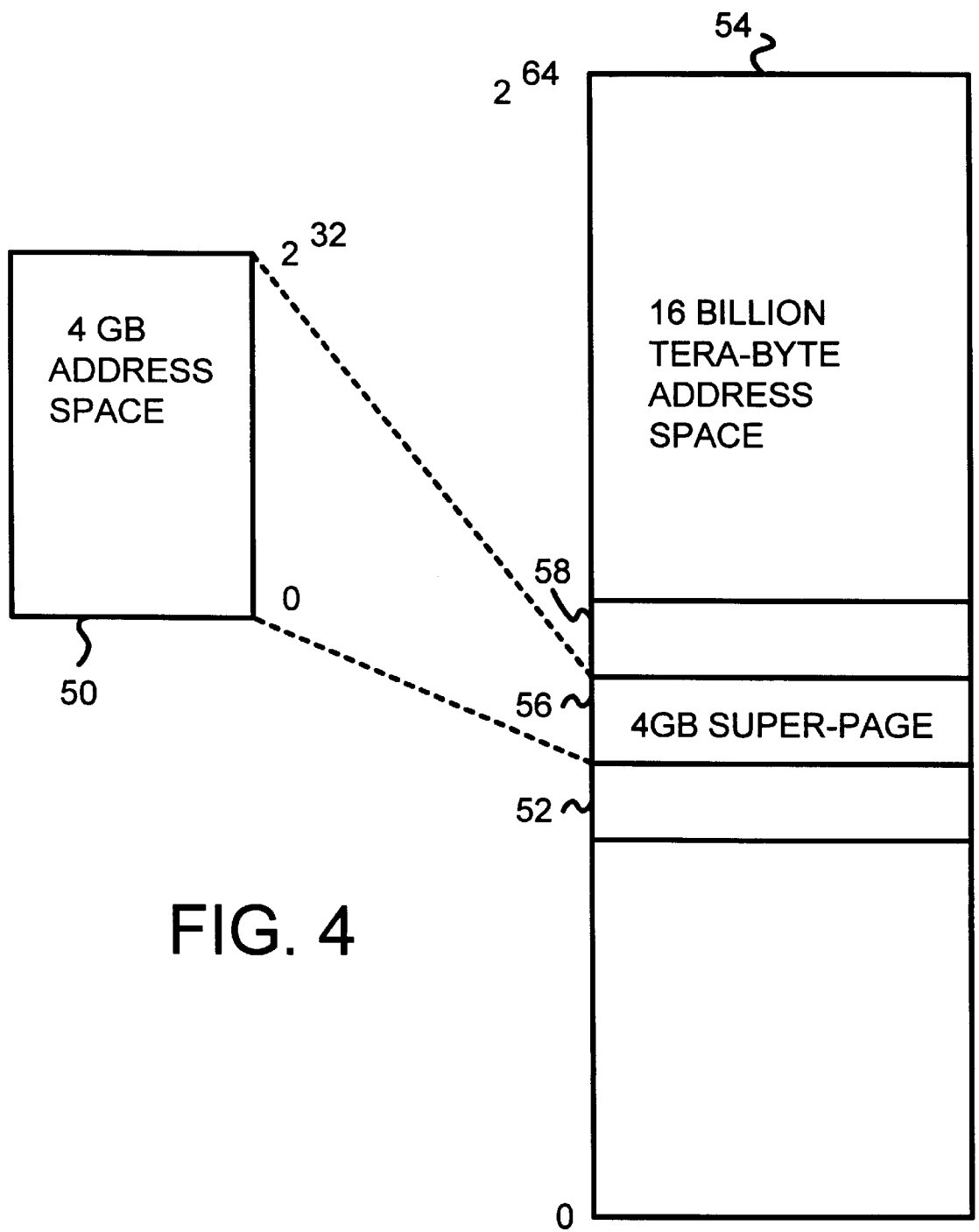
FIG. 4 is a diagram illustrating the 64-bit address space which is composed of 4 Gbyte Super-pages.

FIG. 4 is a diagram illustrating the 64-bit address space which is composed of 4 Gbyte Super-pages. Operands and instruction addresses are 64 bits in width. Thus address space 54 contains $2^{64}$ addressable locations, or 16 million terabytes when bytes are the smallest addressable location.

Address space 54 is divided into 4 Gbyte "super-pages" 50. Each 4 Gbyte super-page 50 contains $2^{32}$ addresses, or 4 Gbytes. All addresses within super-page 50 have the same value of the upper 32 address bits; only the lower 32 address bits, the sub-address, changes for different locations within super-page 50.

Since there are $2^{32}$ possible values of the upper 32 address bits, there are $2^{32}$ or 4 billion super pages 50 in 64-bit address space 54. Operand addresses can be generated without penalty to any address in any super-page 50 in address space 54 since a full 64-bit pipeline is used for generating full 64-bit operand addresses. However, instruction addresses can only be generated without penalty within the current super-page 56. Sequential addresses which cross over to an adjacent sub-page 52, 58 require that the pipelines serialize, a penalty of 3 to 6 clock cycles. Likewise, branch targets in adjacent sub-pages 52, 58 also serialize the pipelines and realize a penalty.

PIPELINE STALLS WHEN 4 GBYTE SUPER-PAGE BOUNDARY CROSSED

The Branching pipeline can only process instructions within the same 4 Gbyte super-page. The pipeline must serialize and stall instructions referencing a different super-page when an address in a different super-page is detected. An instruction can reference a different super-page in two basic ways:

1. The sequential instruction counter rolls over to the next super-page
2. A branch target address is generated which is in a different super-page.

The instruction referencing the new super-page must be stalled, while earlier branch instructions to the old super-page are finished. Once those earlier branch instructions have completed, then the upper-address register can be loaded with the upper 32 bits of the new super-page.

Serializing the pipeline results in a cycle-per-instruction (CPI) loss or penalty. A penalty of 3 to 6 cycles is anticipated for each super-page crossing. As an example, a five-stage pipeline has these stages:

1. D Decode
2. A Address Generate
3. C Operand Cache Access
4. E Execute
5. W Write-Back.

A new super-page is detected early in the pipeline, when the next sequential address and the branch target are generated. These addresses are generated in the first or second pipeline stages; an address comparison in the A stage indicates when a new super-page has been referenced. The pipeline stall can begin with the A stage until earlier instructions have completed the pipeline:

| Old Super-Page | D | A | C | E | W | | | |
|---|---|---|---|---|---|---|---|---|
| NewSuper-Page | D | D | D | D | A | C | E | W |

This shows a three-cycle stall and penalty for a five-stage pipeline. The new value for the upper 32 address bits is calculated in these three stalled cycles and loaded into the upper address bits register as the old super-page is completing at the end of the W stage. Thus by the time that the second instruction, referencing the new super-page, is released to the A stage, the new upper 32 address bits for the new super-page have been loaded into the upper address bits register.

DETECTION OF NEW SUPER-PAGE BY 32-BIT CARRY-OUT

When the upper 32 bits of either the next sequential address of the branch target address differ from the current upper 32 address bits in the upper address bits register, then a new super-page is being referenced. Full 64-bit address generation could be used, and then a compare made of the upper 32 address bits. However, the inventor has realized that lower-32-bit address generation is adequate for detecting when a new super-page is referenced. Since super-pages are aligned to boundaries which are integer multiples of 4 Gbytes, a carry out of bit 32 when generating the sequential or target address indicates that a new super-page is being referenced. Thus the inventor has realized the surprising result that 32-bit address generation can be used to detect 64-bit addresses which reference a different super-page. A comparison of the upper 32 address bits is not explicitly performed. A carry or borrow from the lower 32 address bits alters the upper 32 address bits and serves as the detection signal for a super-page crossing.

Generation of the next sequential address can be performed by a 32-bit incrementer/decrementer. A carry from or borrow to the 32nd bit of the incrementer indicates that the next super-page is referenced. The branch target address is generated by a 32-bit adder which receives the sequential address and a branch displacement. A carry or borrow from bit 32 indicates than a new super-page is referenced.

If the carry is generated late in the cycle or in the pipeline, the instruction can be invalidated and re-started:

| | | | | | | | |
|---|---|---|---|---|---|---|---|
| Old Super-Page | D | A | | C | E | W | |
| New Super-Page | | D | | A | C | Inval | Inval |
| Re-Start New Super-Page | | | | | D | A | C... |

Of course, re-starting the super-page-crossing instruction results in a longer penalty.

ABSOLUTE BRANCHES

Less frequently a branch-absolute instruction is processed. These absolute branches do not perform an add or subtract and thus detecting the super-page crossing by the carry is no possible. Branches to absolute addresses, such as a jump to an address in a register or to an absolute address in a field in the instruction word can be executed by stalling the pipeline while the upper 32 address bits are compared. Typically absolute jumps using an address in the instruction word are limited in the number of address bits and thus cannot reference a new super-page. However, absolute-register branches can reference a new super-page when the register contains all 64 address bits. Thus absolute branches can be supported, although not exactly with the invention's method.

BRANCHING PIPELINE WITH SHARED REGISTER FOR UPPER 32 ADDRESS BITS

Figure 5:
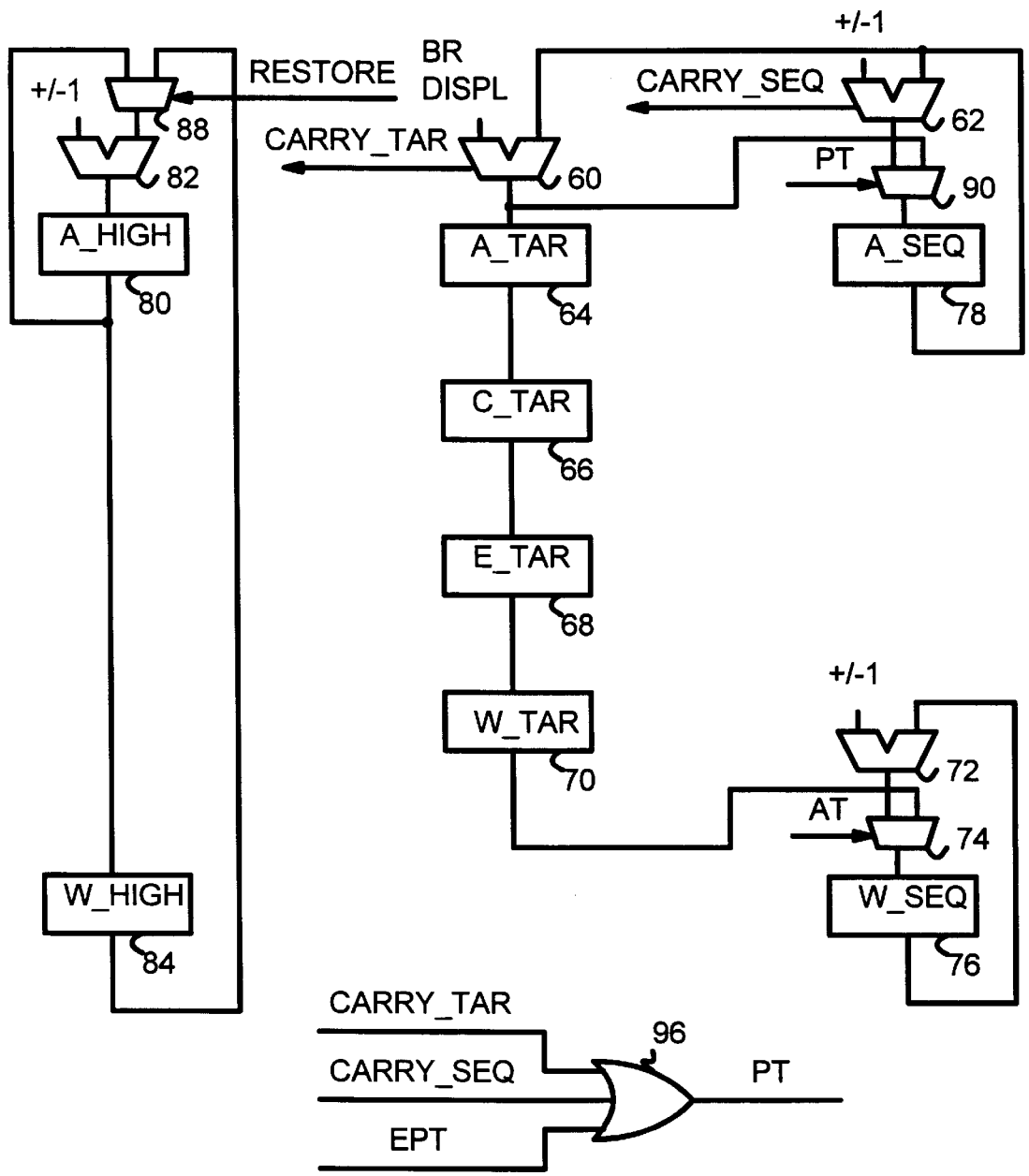
FIG. 5 is a diagram of a branching pipeline with a shared register for the upper 32 bits of a 64-bit address.

FIG. 5 is a diagram of a branching pipeline with a shared register for the upper 32 bits of a 64-bit address. Both the branch target address and the next sequential address are generated at the beginning of the branching pipeline in the address-generate A stage, after the instruction has been decoded in the D stage. A prediction of the outcome of the branch instruction is made, either taken or not-taken, and the sequential sub-address in sequential sub-address register 78 is loaded with the target when the branch is predicted as taken. Otherwise, the sequential address in register 78 is incremented by incrementer or sequential sub-address adder 62 and re-loaded.

Branch target adder 60 receives address components such as a branch displacement which is added to the sequential instruction sub-address from sequential sub-address register 78. Branch displacements are 26 bits or less in size for the PowerPC™. The sum or difference from branch target adder 60 is the target's sub-address when there is no carry or borrow out of the highest-order bit of branch target adder 60.

Sequential adder 62 increments the sequential sub-address from sequential sub-address register 78 to generate the next sequential sub-address. Register 78 is the predicted sub-address and must be reloaded with the correct address when a mis-prediction is detected. The re-loading path is not shown, but more details are disclosed in the related application for "Address Tracking and Branch Resolution in a Processor with Multiple Execution Pipelines and Instruction Stream Discontinuities", U.S. Pat. No. 5,542,109, hereby incorporated by reference. When the branch is predicted taken (PT), then mux 90 selects the target address from branch target adder 60 for loading into sequential sub-address register 78.

Target sub-addresses generated by branch target adder 60 are stored and staged down the pipeline until the branch outcome is resolved. Registers 64, 66, 68, 70 receive the target sub-address for storage during the A, C, E, and W stages, respectively. When a branch is predicted not-taken, but is actually taken, the mis-prediction apparatus reads the correct target sub-address from one of registers 64, 66, 68, 70 and re-loads sequential sub-address register 78 with the correct target sub-address.

The target sub-address is loaded into final sequential register 76 through mux 74 when the branch instruction in the final W stage is actually taken (AT), regardless of whether the branch was predicted correctly or not. Not-taken branches and all other kinds of instructions simply increment the final sub-address in final sequential register 76 using final incrementer or final sequential adder 72. The value of the increment is the size of the instruction, which may be greater than one when the sub-address in register 76 is specified in bytes rather than instruction words.

Registers 76, 78, 64, 66, 68, 70 are all 32 bits in size and contain just the lower 32 address bits of the 64-bit addresses, Thus they contain the lower address bits, the sub-address. All of these registers except final sequential register 76 have the same upper address bits, which are stored in shared upper-address register 80. Since a single shared register for the upper 32 address bits is used for registers 78, 64, 66, 68, 70 storing the lower 32 address bits of the 64-bit address, all these sub-address registers must be addresses in the same super-page. The branching pipeline is thus restricted to processing instructions from a single super-page at any particular time.

TWO REGISTERS FOR UPPER 32 ADDRESS BITS FOR TARGET AND SEQUENTIAL ADDRESSES

Two registers for the upper 32 address bits are needed since a single branch instruction can reference two addresses: the target address and the next sequential address. It is possible that only one of these addresses references the new super-page, while the other address continues in the old super-page. Thus one register is needed to store the new super-page address while a second register is needed to store the old super-page address. Once the branch's outcome is determined, the correct upper 32 address bits for the actual super-page can be selected.

The upper 32 address bits for the final sequential sub-address in W_SEQ register 76 are stored in final super-page register 84. These registers are updated when an instruction completes processing by the pipeline. Thus registers 76, 84 at the end of the pipeline contain an address of the last instruction to complete processing by the pipeline. In a sense, registers 76, 84 are external to the pipeline.

When an instruction generates an address referencing a new super-page, a carry is generated from bit 32. The carry comes from branch target adder 60 when the branch target address is to a new super-page (CARRY_TAR), while the carry comes from sequential sub-address adder 62 when the sequential address is in a new super-page (CARRY_SEQ). Either carry causes the pipeline to serialize, stalling the instruction generating the carry in the decode stage when any other branch instructions are present in the branching pipeline. Once all earlier branch instructions in the A, C, E, W stages have completed, the instruction referencing the new super-page loads the target from branch target adder 60 into register 64, and into register 78 as the new sequential sub-address. Whenever a carry is generated from either branch target adder 60 or sequential sub-address adder 62, branch prediction is forced to taken. OR gate 96 generates the predicted taken (PT) signal which is forced active when either CARRY_TAR or CARRY_SEQ is active. Otherwise, when no carry is generated and all addresses are in the current super-page, the normal prediction signal EPT is passed through OR gate 96. Rather than a prediction, the actual outcome may be known and used to select the correct address in some embodiments.

Forcing a branch's prediction to taken whenever a new super-page is accessed forces the target address to be copied to sequential sub-address register 78. Thus all registers 78, 64, 66, 68, 70 follow the target path and reference the target's super-page. Otherwise, sequential sub-address register 78 could reference a different super-page than target registers 64, 66, 68, 70, and an additional super-page register would be needed.

When the sequential sub-address adder 62 generates a carry, but the instruction is not a branch instruction with a target, then no valid address is in target registers 64, 66, 68, 70 once earlier branch instructions complete. The carry from sequential sub-address adder 62, CARRY_SEQ, then causes super-page adder 82 to increment the upper 32 address bits in A_HIGH register 80 to point to the new super-page.

When the instruction referencing the new super-page is a branch, the prediction is forced to taken, and the new upper 32 address bits are generated for the new super page. Super-page adder 82 adds or subtracts the carry or borrow from adder 60 (CARRY_TAR) to the old super-page address bits stored in shared upper-address register 80. The new super-page address is loaded into shared upper-address register 80.

As the instruction passes down the pipeline through the A, C, E, and W stages, the upper 32 address bits are located in shared upper-address register 80. By the W stage, the actual outcome of the branch is determined and final sequential register 76 is loaded with either the target sub-address from register 70 or the sequential sub-address generated by final sequential adder 72.

Final super-page register 84 is loaded with the new super-page address upper bits from shared upper-address register 80 when the sub-address loaded into final sequential register 76 is a sub-address for the new super-page. When the carry was generated from branch target adder 60, the new super-page refers to the target address. Thus if the target is eventually loaded into final sequential register 76, then final super-page register 84 is also loaded with the new super-page address from register 80.

However, if the branch is not taken, then the sequential address is loaded. When branch target adder 60 generated the carry, and not sequential adder 62, the sequential address is for the old super-page. Thus final super-page register 84 contains the correct super-page address. Final super-page register 84 is then used to re-load shared upper-address register 80 using mux 88 since the branch to the new super-page was not actually taken.

Thus when a branching reference to a new super-page is detected by a carry from either branch target adder 60 or sequential sub-address adder 62, then the prediction is forced to predicted taken (PT). This causes both the sequential and target registers to all follow the target path to either the new super page or to the old super-page. Thus a single super-page register can be used for both target and sequential registers.

When the branch instruction is the last address of the super page, but the branch has a negative displacement (it jumps backwards into the current super-page), the new super-page for the sequential path is generated as part of the mis-prediction recovery. Since the target path is always predicted, the sequential path crossing to a new super-page is always a mispredicted branch. Once the outcome is known, the A-stage sequential sub-address register 78 is re-loaded with the sequential address from W-stage sequential register 76. The upper 32 address bits are generated by super-page adder 82, which adds the carry to the old super-page address stored in register 80. The original carry from sequential sub-address adder 62, CARRY_SEQ, can be saved and staged down the pipeline so it can be added to the increment input of adder 82.

When both the target and the sequential address reference the next super-page, then no adjustment of the super-page is needed during mis-prediction recovery. The target adder carry, CARRY_TAR, can also be saved for identifying this case.

There is another rare case which can occur when the branch is an absolute branch with the target stored in a 64-bit register. This strange case occurs when the branch instruction is in the current super-page (super-page A), and the sequential address references the next super-page (super-page B), but the target is in still another super-page, a third super-page C. The method described above is followed. The branch is predicted taken, loading the new super-page of the target into super-page register 80 from the 64-bit register with the branch target. When the outcome is determined near the end of the pipeline, and the branch is actually taken, then the super-page address from register 80 is copied to W-stage super-page register 84. However, when the branch is actually not taken, a mis-prediction occurs. During the mis-prediction recovery, the sequential sub-address from W-stage sequential register 76 is copied to A-stage sequential sub-address register 78. The old super-page address kept in W-stage super-page register 84 is selected by mux 88 and input to super-page adder 82, which also receives the carry from sequential adder 62, CARRY_SEQ, which was stored earlier. Super-page adder 82 then adds the sequential carry to the old super-page address from register 84 to generate the new super-page address, which is loaded into super-page register 80. The new super-page address is then copied from A-stage super-page register 80 to W-stage super-page register 84.

The carry is negative, a borrow, when instruction addresses sequence downward. A negative carry is then added by super-page adder 82 to generate the next lower super-page's address.

It may be preferred to not process any instructions which follow the branch which references a new super-page until that branch is resolved.

OPERAND ADDRESSES

Since the operand pipeline is a full 64-bit pipeline, instructions which reference operands to different super-pages can be freely mixed in the pipeline. A full 64-bit adder is provided for address generation. Carry prediction from bit 32 of the adder to the upper 32 bits can improve performance, causing a stall if the prediction is wrong. Several bits before bit 32 can be observed to determine the bit-32 carry and improve prediction accuracy. See for example "High-Performance Adder Using Carry Predictions", U.S. Pat. No. 5.097,436.

ALTERNATE EMBODIMENTS

Several other embodiments are contemplated by the inventor. For example the instruction format of 32 bits may be extended to 64 bits with additions to instruction decode and fetch logic. Full 64-bit addresses can be stored in architectural registers visible to the programmer or operating system, such as the PowerPC™ link register (LR), count and return (CTR), and Status and Return (SRR0) registers.

Super-scalar operation is preferred, with additional pipelines being used. Both integer and floating point operand pipelines can be implemented.

Branch prediction can be disabled for instructions which reference new super-pages. Since the pipeline stalls to allow earlier instructions to complete, the flags are already set before the branch instruction referencing the new super-page is released. Thus the correct outcome is known when the branch is released from the D stage. The correct outcome can be used to select the target or the sequential address in the A stage, rather than wait until the W stage to determine the branch's outcome and select either the target or sequential address. Thus the sequential sub-address register can be correctly loaded for branches referencing new super-pages, and mis-predictions can be avoided.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A sixty-four-bit processor for generating 64-bit addresses of instructions and 64-bit operands, the processor comprising:

an operand pipeline for executing algebraic instructions on the 64-bit operands and generating 64-bit results, the operand pipeline generating 64-bit addresses of operands;

a branching pipeline for processing conditional branch instructions, the branching pipeline outputting a 64-bit target address when a conditional branch instruction is taken, but the branching pipeline outputting a 64-bit sequential address when the conditional branch instruction is not taken, the branching pipeline including:

target adder means for generating a target sub-address having less than 64 address bits;

pipeline means for successively storing the target sub-address and other target sub-addresses from other branch instructions in a plurality of target sub-address registers;

a shared upper-address-bits register for storing a plurality of most-significant address bits for the target sub-address and for the other target sub-addresses in the plurality of target sub-address registers;

target output means, coupled to the shared upper-address-bits register and the pipeline means, for combining the plurality of most-significant address bits with the target sub-address to output the 64-bit target address when the conditional branch instruction is taken; and sequential output means for outputting the 64-bit sequential address when the conditional branch instruction is not taken, whereby the shared upper-address-bits register stores most-significant address bits for the plurality of target sub-addresses in the target sub-address registers.

2. The sixty-four-bit processor of claim 1 wherein the branching pipeline further comprises:

detect means, coupled to the target adder means, for detecting when the 64-bit target address has most-significant address bits which do not match the most-significant address bits stored in the shared upper-address-bits register, the detect means outputting an overflow signal; and stall means, coupled to the detect means, for stalling execution of the conditional branch instruction when the overflow signal is output until other conditional branch instructions have completed processing and the other target sub-addresses in the plurality of target sub-address registers have been removed from the plurality of target sub-address registers, whereby the plurality of target sub-address registers can only contain target sub-addresses for 64-bit target addresses having the most-significant address bits matching the shared upper-address-bits register.

3. The sixty-four-bit processor of claim 2 further comprising:

a sequential sub-address register for storing a sequential sub-address having less than 64 address bits;

sequential increment means, coupled to the sequential sub-address register, for incrementing the sequential sub-address when the conditional branch instruction is not taken or when non-branching instructions are processed; and wherein the sequential output means is coupled to the shared upper-address-bits register and includes means for combining the plurality of most-significant address bits with the sequential sub-address to output the 64-bit sequential address when the conditional branch instruction is not taken, whereby the shared upper-address-bits register stores the most-significant address bits for the 64-bit sequential address and the 64-bit target address.

4. The sixty-four-bit processor of claim 3 further comprising super-page-crossing detect means, coupled to a carry-out signal from the sequential increment means, for signaling that the 64-bit sequential address has most-significant address bits which do not match the most-significant address bits stored in the shared upper-address-bits register, whereby the carry out signal detects an overflow indicating when the 64-bit sequential address has most-significant address bits which do not match the most-significant address bits stored in the shared upper-address-bits register.

5. The sixty-four-bit processor of claim 4 further comprising:

shared upper-address-bits increment means, coupled to the shared upper-address-bits register, for incrementing the most-significant address bits when the overflow signal is received, whereby the most-significant address bits are incremented in response to the overflow signal.

6. The sixty-four-bit processor of claim 5 further comprising:

a backup shared register, coupled to receive a copy of the most-significant address bits from the shared upper-address-bits register.

7. The sixty-four-bit processor of claim 5 further comprising:

prediction means, coupled to the detect means, for forcing a conditional branch prediction of taken when an overflow is signaled, whereby the conditional branch instruction is predicted taken when the most-significant address bits do not match the most-significant address bits stored in the shared upper-address-bits register.

8. The sixty-four-bit processor of claim 5 further comprising:

physical address output means, coupled to the target output means, for removing a predetermined number of most-significant address bits of the 64-bit target address to generate a physical address having less than 64 bits but more than 32 bits.

9. The sixty-four-bit processor of claim 2 wherein the most-significant address bits are exclusive of address bits stored in the target sub-address registers, whereby the most-significant address bits do not overlap sub-address bits.

10. The sixty-four-bit processor of claim 9 wherein the most-significant address bits stored in the shared upper-address-bits register comprise 32 address bits and wherein the target sub-address registers store a sub-address of 32 address bits.

11. The sixty-four-bit processor of claim 9 wherein the target adder means comprises a 32-bit adder and wherein the overflow signal is a carry out of a most-significant 32nd bit-position in the 32-bit adder, whereby the carry out detects an overflow indicating when the 64-bit target address has most-significant address bits which do not match the most-significant address bits stored in the shared upper-address-bits register.

12. A method for generating a 64-bit address comprising the steps of:

when the 64-bit address is an operand address:
adding a 64-bit address component to other address components in a 64-bit adder and generating a 64-bit result from the 64-bit adder;
transferring the 64-bit result to a memory-interface unit as the 64-bit address;

when the 64-bit address is an instruction address of a conditional branch:
generating a 32-bit target sub-address of a 64-bit target address in a 32-bit target adder by adding a branch displacement having less than 32 bits to a sequential sub-address having 32 bits;
stalling the conditional branch until all earlier branches have completed processing when a carry-out from bit 32 of the 32-bit target adder is detected;
staging the 32-bit target sub-address of the 64-bit target address down a branching pipeline through a series of 32-bit target registers;
resolving the conditional branch to determine if the conditional branch is taken or not taken to the 64-bit target address;
incrementing a super-page address in a shared 32-bit register when the carry-out from bit 32 of the 32-bit target adder is detected and the conditional branch is taken, but not incrementing the super-page address when the conditional branch is not taken;
concatenating the super-page address in the shared 32-bit register with the 32-bit target sub-address from a register in the series of 32-bit target registers to generate the 64-bit target address; and
outputting the 64-bit target address to the memory-interface unit as the 64-bit address when the conditional branch is taken,
whereby the 64-bit target address is generated from the 32-bit target adder and the shared 32-bit register.

13. The method of claim 12 further comprising the steps of:
generating a next sequential sub-address by incrementing a current sequential sub-address in a 32-bit incrementer;
generating a sequential carry-out when incrementing the current sequential sub-address when the current sequential sub-address is a maximum value representable by 32 bits;
incrementing the super-page address in the shared 32-bit register when the sequential carry-out from the 32-bit incrementer is generated and the conditional branch is not taken, but not incrementing the super-page address in response to the sequential carry-out when the conditional branch is taken;
concatenating the super-page address in the shared 32-bit register with the 32-bit sequential sub-address from the 32-bit incrementer to generate a 64-bit sequential address; and
outputting the 64-bit sequential address to the memory-interface unit as the 64-bit address when the conditional branch is not taken,
whereby the 64-bit sequential address is generated from the 32-bit incrementer and the shared 32-bit register.

14. An extended central processing unit (CPU) for executing general-purpose instructions including a branch instruction, the CPU comprising:

a memory interface for accessing a virtual memory space or more than four Gigabytes, the memory interface receiving a full-width address having a full width of address bits;

an execution unit, receiving a first operand and a second operand, for generating a result, the first operand and the second operand and the result each having the full width;

operand fetch means, coupled to the memory interface, for retrieving the first operand and the second operand, the first operand located at a full-width operand address, the operand fetch means transferring the first operand and the second operand to the execution unit;

an operand address adder, coupled to the operand fetch means, for adding address components including at least one full-width address component to generate the full-width operand address;

a sequencer for incrementing a sequential instruction sub-address having a reduced width with fewer address bits than the full width of address bits;

a branch target adder for adding the sequential instruction sub-address to a branch displacement, for generating as a sum a target sub-address having the reduced width;

a shared super-page register for storing upper address bits, the upper address bits being bit-positions in the full width but not in the reduced width;

wherein the sequential instruction sub-address and the target sub-address are portions of addresses having upper address bits stored in the shared super-page register;

a branch resolver, coupled to the shared super-page register and the branch target adder and the sequencer, for outputting to the memory interface as a next instruction's address the upper address bits from the shared super-page register and the target sub-address when a conditional branch instruction is a taken branch, but outputting as the next instruction's address the upper address bits from the shared super-page register and the sequential instruction sub-address when the conditional branch instruction is a not-taken branch;

wherein the next instruction's address has the full width of address bits, whereby the shared super-page register contains the upper address bits for both the target sub-address and the sequential instruction sub-address.

15. The extended CPU of claim 14 wherein the branch target adder has a target carry-out signal generated when a carry occurs in a most-significant bit-position of the reduced-width, the extended CPU further comprising:

a super-page adder, receiving the upper address bits from the shared super-page register, for adding the target carry-out signal to the upper address bits from the shared super-page register to generate new upper-address bits when the conditional branch instruction is taken and the target carry-out signal is generated.

16. The extended CPU of claim 15 wherein the sequencer has a sequential carry-out signal generated when a carry occurs in a most-significant bit-position of the reduced-width, and wherein the super-page adder also receives the sequential carry-out from the sequencer, the super-page adder adding the sequential carry-out signal to the upper address bits from the shared super-page register to generate the new upper-address bits when the conditional branch instruction is not taken and the sequential carry-out signal is generated.

17. The extended CPU of claim 15 wherein the reduced width is 32 address bits.

18. The extended CPU of claim 14 wherein the full width is 64 address bits.

19. The extended CPU of claim 14 wherein the full width has twice as many address bits as does the reduced width.

20. The extended CPU of claim 14 wherein the operand fetch means includes a register file for temporarily storing the first operand and the second operand and the result.

* * * * *